(12) United States Patent
Komata

(10) Patent No.: US 6,726,566 B2
(45) Date of Patent: Apr. 27, 2004

(54) METHOD FOR CHANGING VIEWPOINTS USING PRESSURE-SENSITIVE MEANS, RECORDING MEDIUM PROVIDING SOFTWARE PROGRAM THEREFOR, AND ENTERTAINMENT SYSTEM

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 10/288,697

(22) Filed: Nov. 5, 2002

(65) Prior Publication Data

US 2003/0064803 A1 Apr. 3, 2003

Related U.S. Application Data

(63) Continuation of application No. 09/757,811, filed on Jan. 10, 2001.

(30) Foreign Application Priority Data

Jan. 14, 2000 (JP) .......................................... 2000-40256

(51) Int. Cl.⁷ .............................. A63F 13/06; G09G 5/00
(52) U.S. Cl. ....................... 463/30; 463/37; 273/148 B; 345/161; 345/781
(58) Field of Search ................................ 463/1, 30–33, 463/36–37, 47; 273/148 R, 148 B, 459–461; 338/99, 114, 47; 345/156, 159, 161, 781; 310/311; 369/52.1, 53.1

(56) References Cited

U.S. PATENT DOCUMENTS

| | | |
|---|---|---|
| 5,207,426 A | 5/1993 | Inoue et al. |
| 5,286,024 A | 2/1994 | Winblad |
| 5,510,812 A | 4/1996 | O'Mara et al. |
| 5,555,004 A | 9/1996 | Ono et al. |
| 5,589,828 A * | 12/1996 | Armstrong .................... 341/20 |
| 5,624,117 A * | 4/1997 | Ohkubo et al. .......... 273/148 B |
| 5,689,285 A | 11/1997 | Asher |
| 5,764,219 A | 6/1998 | Rutledge et al. |
| 5,923,317 A | 7/1999 | Sayler et al. |
| 5,963,196 A | 10/1999 | Nishiumi et al. |
| 5,971,853 A | 10/1999 | Kataoka et al. |
| 5,984,785 A | 11/1999 | Takeda et al. |
| 5,999,084 A | 12/1999 | Armstrong |
| 6,102,802 A | 8/2000 | Armstrong |
| 6,135,886 A * | 10/2000 | Armstrong .................... 463/37 |
| 6,155,926 A | 12/2000 | Miyamoto et al. |

FOREIGN PATENT DOCUMENTS

| | | |
|---|---|---|
| EP | 0 302 158 A2 | 2/1989 |
| JP | 5-87760 A2 | 11/1993 |
| JP | 7-302159 A2 | 11/1995 |
| JP | 10-113467 | 5/1998 |
| JP | 11-9837 | 1/1999 |
| TW | 288636 | 10/1996 |

\* cited by examiner

Primary Examiner—Teresa Walberg
Assistant Examiner—Scott E. Jones
(74) Attorney, Agent, or Firm—Katten Muchin Zavis Roseman

(57) ABSTRACT

A recording medium on which is recorded a computer-readable and executable software program that performs processing by taking as instructions an output from a controller used in an entertainment system. The controller has a pressure-sensitive unit. The software program used in the entertainment system, in a mode in which the viewpoint position of objects within the screen of the entertainment system is switched, switches the position of the viewpoint of an object depending on the output of the controller.

21 Claims, 18 Drawing Sheets

METHOD FOR CHANGING VIEWPOINTS USING PRESSURE-SENSITIVE MEANS, RECORDING MEDIUM PROVIDING SOFTWARE PROGRAM THEREFOR, AND ENTERTAINMENT SYSTEM

CROSS-REFERENCE TO RELATED APPLICATIONS

This is a continuation of U.S. application Ser. No. 09/757,811, filed Jan. 10, 2001, now pending.

FIELD OF THE INVENTION

The present invention relates to a method of making viewpoint changes, and a recording medium and an entertainment system for executing the method, wherein the viewpoint is changed depending on the output of the pressure-sensitive means of a controller to be connected to the entertainment system.

BACKGROUND OF THE INVENTION

Computers include those that are used as entertainment systems represented primarily by game machines. In such an entertainment system, an operator (user) uses control elements provided on a controller to control the start, progress and end of a game.

The generation of images in the progress of a game is currently performed as follows. Video games, wherein the positions of objects and the like in three-dimensional coordinates are calculated in real time, subjected to perspective transformation into two dimensions, and texture is mapped to the objects subjected to perspective transformation in polygon units, have become the mainstream.

In addition, when the user operates a controller, for example, when the pushing of the same key by the user is repeated multiple times or when a ten-key pad is selected and is pushed corresponding to the viewpoint position, the position of the viewpoint may be switched based on this operation, so the objects and backgrounds and the like viewed from the position of the point of view are found by calculation, and based upon the above processing, the objects are displayed as two-dimensional images on the screen of a television monitor.

In addition, methods of switching the viewpoint include those performed by ON/OFF switches provided on the controller connected to the video game machine, those performed depending on the position of an object moved by the controller, or those performed by turning the switches ON by the user continuously, namely when they are pushed and held by the user, and thus the viewpoint switching is performed continuously.

An example of switching the viewpoint in a game is disclosed in the publication of unexamined Japanese Patent Laid-open Publication No. JP-A-H7-116343.

On the other hand, the so-called pressure-sensitive type controllers are used as input devices for computers, and as input devices for entertainment systems represented by game machines, for example. This pressure-sensitive controller is a unit wherein, when pressure is applied with a finger directly to a control element connected to a pressure-sensitive device, the pushing pressure is provided as output as a pressure-sensitive value. A specific example thereof is, for example, a pressure-sensitive type controller disclosed in the publication of examined Japanese Utility Model Publication No. JP-Y-H1-40545, wherein pressure-sensitive output is provided as input to a VCO (variable control oscillator) and the output of the VCO is used for repeated fire in a game.

SUMMARY OF THE INVENTION

It is the object of the present invention to make the viewpoint switching by simple ON/OFF switches easier-to-use for users by utilizing the characteristics of the pressure-sensitive controller.

This and other objects of the present invention are attained by a recording medium on which is recorded a computer-readable and executable software program that performs processing by taking as instructions an output from a controller which has pressure-sensitive means, wherein said software program comprises, in a mode in which a viewpoint of objects within a screen of the computer is switched, switching a position of the viewpoint depending on the output of said controller.

A method of switching the viewpoint according to the present invention comprising the steps of switching the viewpoint of an entertainment system including a controller which has pressure-sensitive means; sensing a pushing pressure of a user on said controller by said pressure-sensitive means which has at least one or more pressure-sensitive buttons, and receiving at said entertainment system a pressure-sensitive output signal corresponding to the said pushing pressure from said controller; and in a mode in which the viewpoint of objects within a screen is switched, switching a position of the viewpoint depending on the pressure-sensitive output signal of said controller.

An entertainment system according to the present invention comprising a controller which has pressure-sensitive means, and at least one or more pressure-sensitive buttons that sense a pushing pressure of a user operating said buttons; means for receiving a pressure-sensitive output signal corresponding to the said pushing pressure from said controller, and, in a mode in which a viewpoint with respect to objects within a screen is switched, switching the position of the viewpoint depending on the pressure-sensitive output signal of said controller.

DETAILED DESCRIPTION OF THE PREFERRED EMBODIMENT

Here follows a detailed description of the method of using pressure-sensitive means for viewpoint changes, and recording medium and entertainment system for a program for same according to the present invention.

In a controller that uses a pressure-sensitive device, when the button which is the control element is pushed by a user, not only is the presence of a pressure-sensitive output detected, for example, as the ON/OFF of a switch, but a pressure-sensitive value output which depends on the pushing pressure of the user on the control element is also obtained. On the other hand, in software or games that use pressure-sensitive value output, various processing or actions can be entered depending on the pressure-sensitive value output. In this embodiment, even switching the viewpoint by operating a plurality of control elements, it is possible to change the viewpoint from the base position depending on the pressure-sense values based on the pushing operation of various control elements by the user depending on the viewpoint position.

In this embodiment, the viewpoint is set in real time depending on the pressure-sensing value output when a controller that has pressure-sensitive devices is operated. Thereby, it is intended to provide a system with a user interface that is improved in comparison to the repeated or continuous turning ON of a simple ON/OFF switch.

Figure 1:
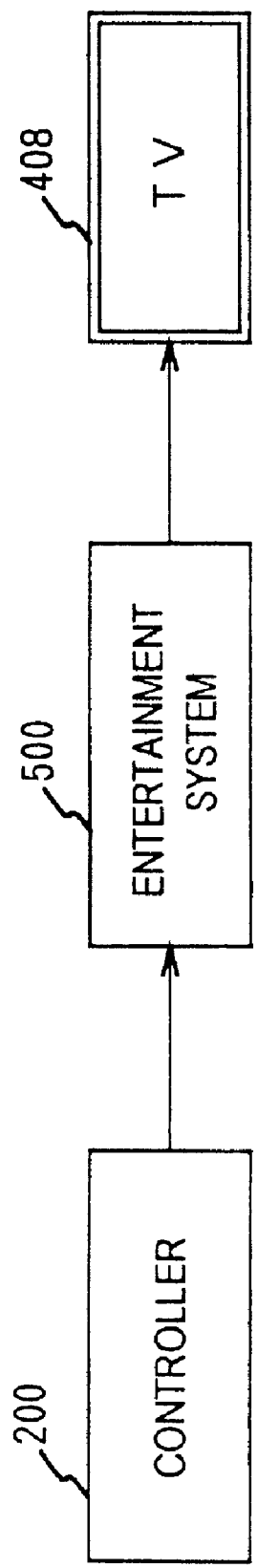
FIG. 1 diagrammatically shows connection of a controller to an entertainment system in order to enable a user to enjoy game software or videos.
Figure 5:
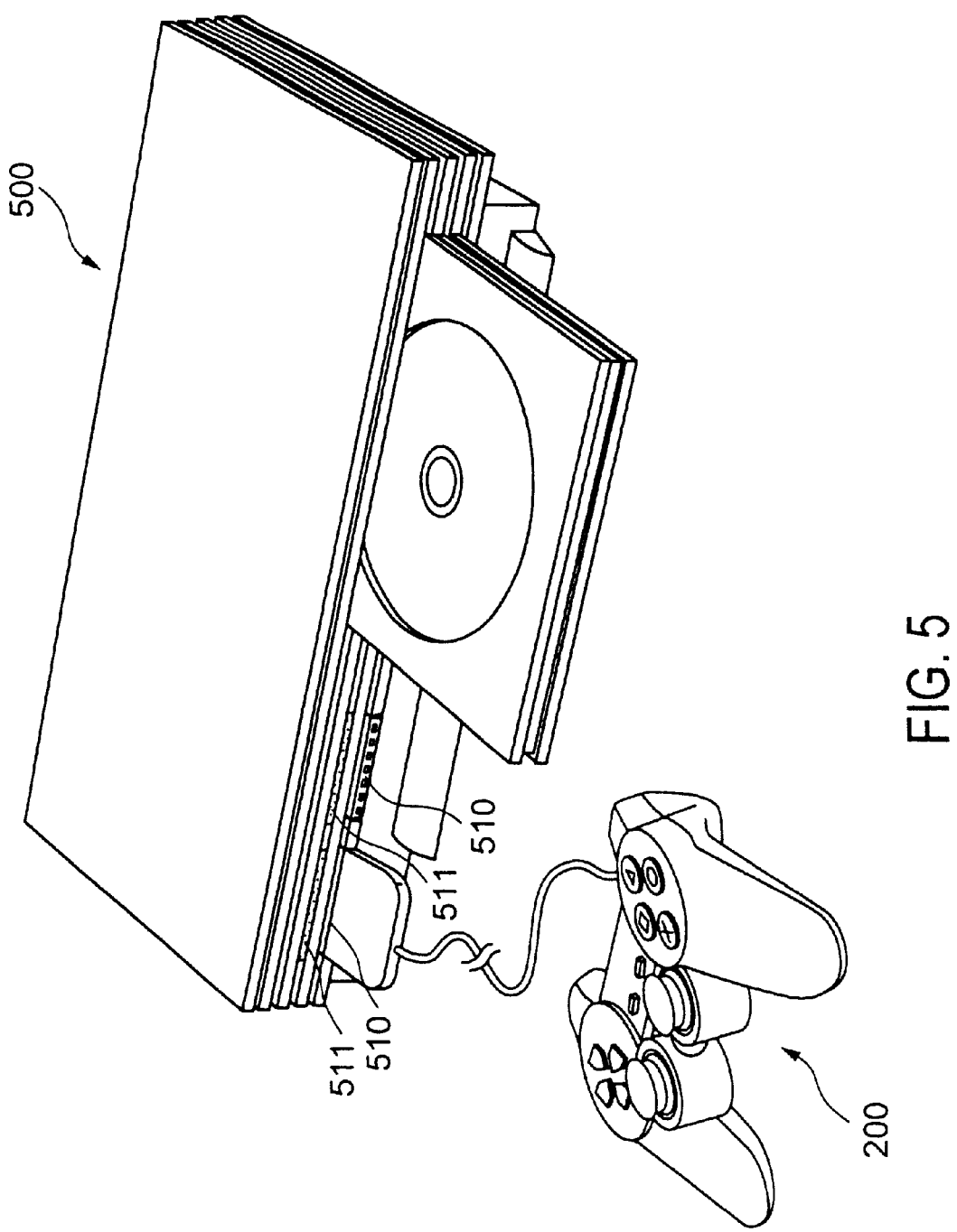
FIG. 5 is a perspective view of showing the controller connected to the entertainment system.

FIG. 1 is a diagram showing a connection of a controller 200 to an entertainment system 500 to enable a user to enjoy game software or video. More specific structures are shown in FIG. 5 and the following figures.

As shown in FIG. 1, a controller 200 which has buttons connected to pressure-sensitive devices is connected to an entertainment system 500 used for playing games or enjoying DVD video or other types of video images, and the video output terminals are connected to a television monitor 408. Here, the analog output from the pressure-sensitive devices is converted by an A/D converter to digital values in the range 0–255 and provided to the entertainment system 500.

Figure 2:
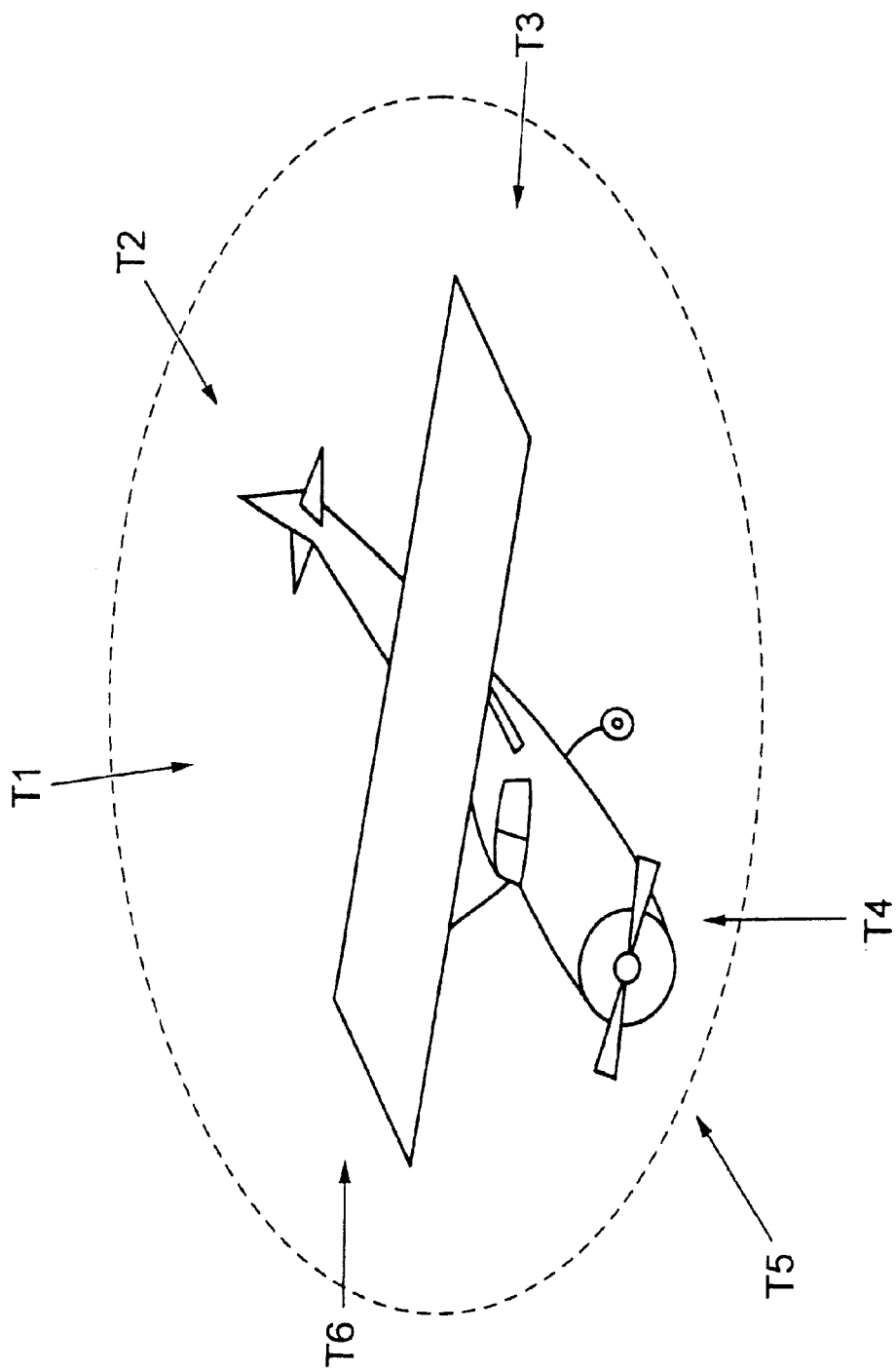
FIG. 2 is a diagram using an airplane as an example of an object to explain the various viewpoints T1, T2, . . . , T6 for viewing the object on a screen.
Figure 3A:
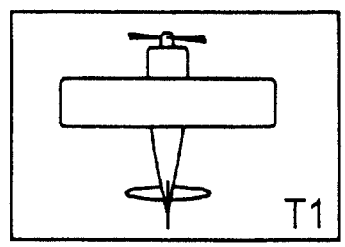
FIGS. 3A–3F show examples of screen displays when the object is viewed from the various viewpoints T1 through T6 shown in FIG. 2.
Figure 3B:
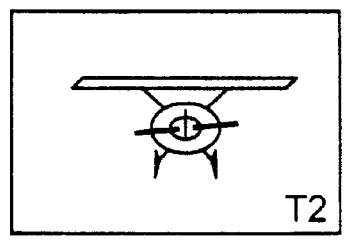
Figure 3C:
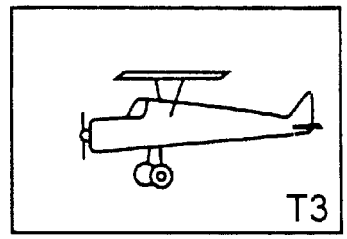
Figure 3D:
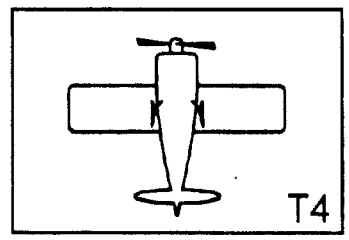
Figure 3E:
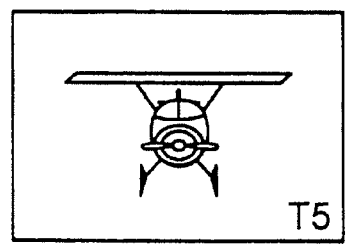
Figure 3F:
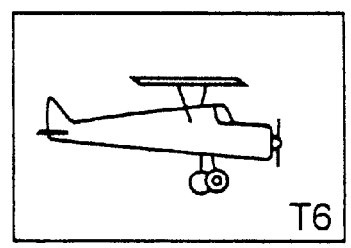
Figure 4:
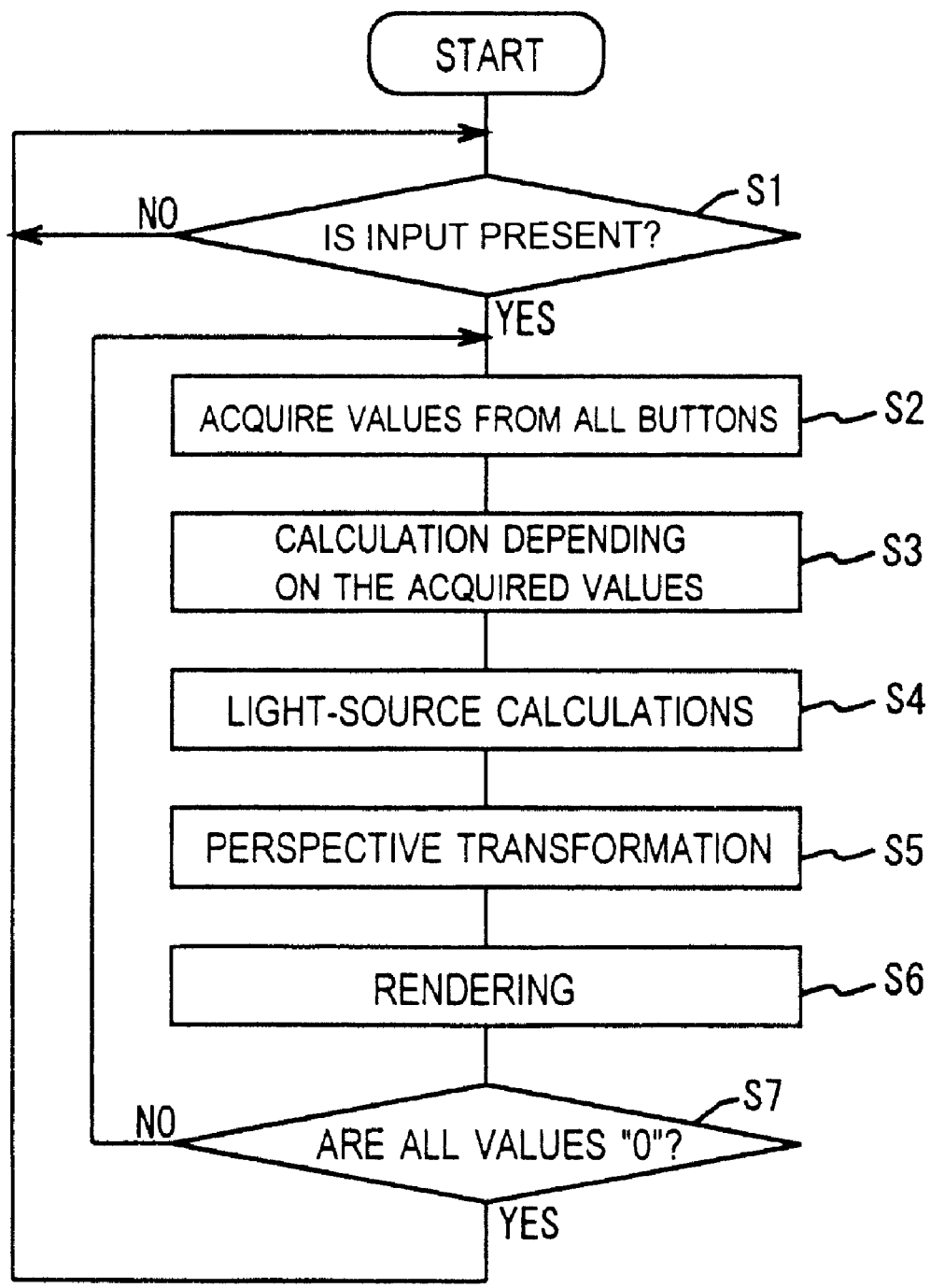
FIG. 4 shows a flowchart of a method of switching the viewpoint in real time depending on a pressure-sensing value.

With reference to FIGS. 2–4, the case of changing the viewpoint by operating the controller 200 will be described. It is assumed that a plurality of buttons are provided on a controller 200, and each of this plurality of buttons is connected to a pressure-sensitive device of the controller. In order to simplify the description, use of an airplane will be used as an example of the object as shown in FIG. 2, for example, and six buttons provided upon the controller 200 correspond to the six viewpoints T1, T2, . . . , T6 for viewing the object, and each of the buttons is connected to a pressure-sensitive device. In addition, at the time when the pressure-sensitive values are first given, the viewpoints T1 through T6 are set as the base positions for the six buttons, respectively, and thereafter, the positions of the viewpoints are sequentially increased or decreased in the viewing direction depending on the pressure-sense value corresponding to the pushing operation.

In this case, the increase or decrease of the position of the viewpoint depending on the pressure-sensitivity value is defined. When a pressure-sensing value is given by means of the pushing operation of the user, on control elements of the controller, the change in the viewpoint position is determined depending on that pressure-sensing value. In addition, the viewing direction is defined. In FIG. 2, for example, when a pressure-sensing value is given to the button allocated to that viewpoint, the direction in which the viewpoint moves closer to the adjacent viewpoint position which is the base position, or wherein the viewpoint moves farther away from the adjacent viewpoint position depends on the pressure-sensing value. In addition, the viewpoint position is set depending on all pressure-sensitive values, so if the button corresponding to viewpoint T2 and the button corresponding to viewpoint T3 are both pushed by the user, depending on the differential between both pressure-sensitive values, the viewpoint is moved on the side of the viewpoint with the higher pressure-sensitive value.

FIGS. 3A–3F show examples of image displays in the case when the object is viewed from the various viewpoints T1 through T6 shown in FIG. 2. Namely, FIG. 3A is a view from the viewpoint T1, FIG. 3B is a view from the viewpoint T2, FIG. 3C is a view from the viewpoint T3, FIG. 3D is a view from the viewpoint T4, FIG. 3E is a view from the viewpoint T5, and FIG. 3F is a view from the viewpoint T6.

With reference to FIG. 4, the method of switching the viewpoint in real time depending on the pressure-sensitive values will be described. The flowchart shown in FIG. 4 illustrates the processing of the program for viewpoint switching.

In FIG. 4, in Step S1, a decision is made as to whether or not pressure-sensing values are supplied based on the pushing of the six buttons allocated to the viewpoints T1 through T6, respectively. If even one is present, control moves to Step S2 where the pressure-sensing values sensed respectively from all of the buttons are acquired, and on to Step S3 where calculations are performed depending on the values thus acquired. To wit, the viewpoint position is determined depending on the six pressure-sensing values, and the coordinates (X, Y, Z) of the object in three-dimensional space prepared in advance by the game software are modified based on this viewpoint position.

The determination of the viewpoint position is set such that, in the relationships between viewpoints T2 and T3, viewpoints T3 and T5, viewpoint T5 and viewpoint T6, viewpoint T6 and viewpoint T2, viewpoint T1 and viewpoints T2 through T5, the position is offset toward the higher by the amount of the differential. For example, in the relationship between the viewpoints T2 and T3, if the pressure-sensing value corresponding to viewpoint T2 is "254" out of the range "0" to "255" and the pressure-sensing value corresponding to viewpoint T3 is "253" out of the range "0" to "255," then the pressure-sensing value corresponding to viewpoint T2 is greater than the pressure-sensitive value corresponding to viewpoint T3 of "253" by the amount of the differential equal to "1." Therefore, the viewpoint position in this case is set exactly $\frac{1}{128}$ toward the viewpoint position T2 from the midpoint position between the viewpoint positions T2 and T3. Naturally, if the pressure-sensing values were the same, the viewpoint position would be set at the aforementioned midpoint position.

Once the various coordinates of object vertices are correct depending on the viewpoint position thus set, in Step S4, based on light-source calculations, the intensity of pixels at the vertices indicated by various coordinate values are set.

In Step S5, the vertex coordinate values of the object are subjected to perspective transformation and transformed into two-dimensional coordinate values.

In Step S6, texture data is mapped to the region indicated by these two-dimensional coordinate values, and the rendering process is performed to generate one frame of the image. The image thus generated is displayed on the television monitor 408 shown in FIG. 1.

In Step S7, a decision is made as to whether or not all of the pressure-sensing values are "0" and if "YES" then control moves back to Step S2, but if "NO" then control processing moves back to Step S1.

An embodiment of this invention that is applied to a controller of a video game system that is an example of a computer is explained below.

FIG. 5 is a perspective view showing the controller 200 connected to entertainment system 500. The controller 200 is removably connected to the entertainment system 500, and the entertainment system 500 is connected to television monitor 408 as described above.

The entertainment system 500 reads the program for a computer game from recording media upon which that program is recorded and by executing the program displayed characters on the television monitor 408. The entertainment system 500 has also various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters displayed on the television monitor 408 in the directions up, down, left or right.

Figure 6:
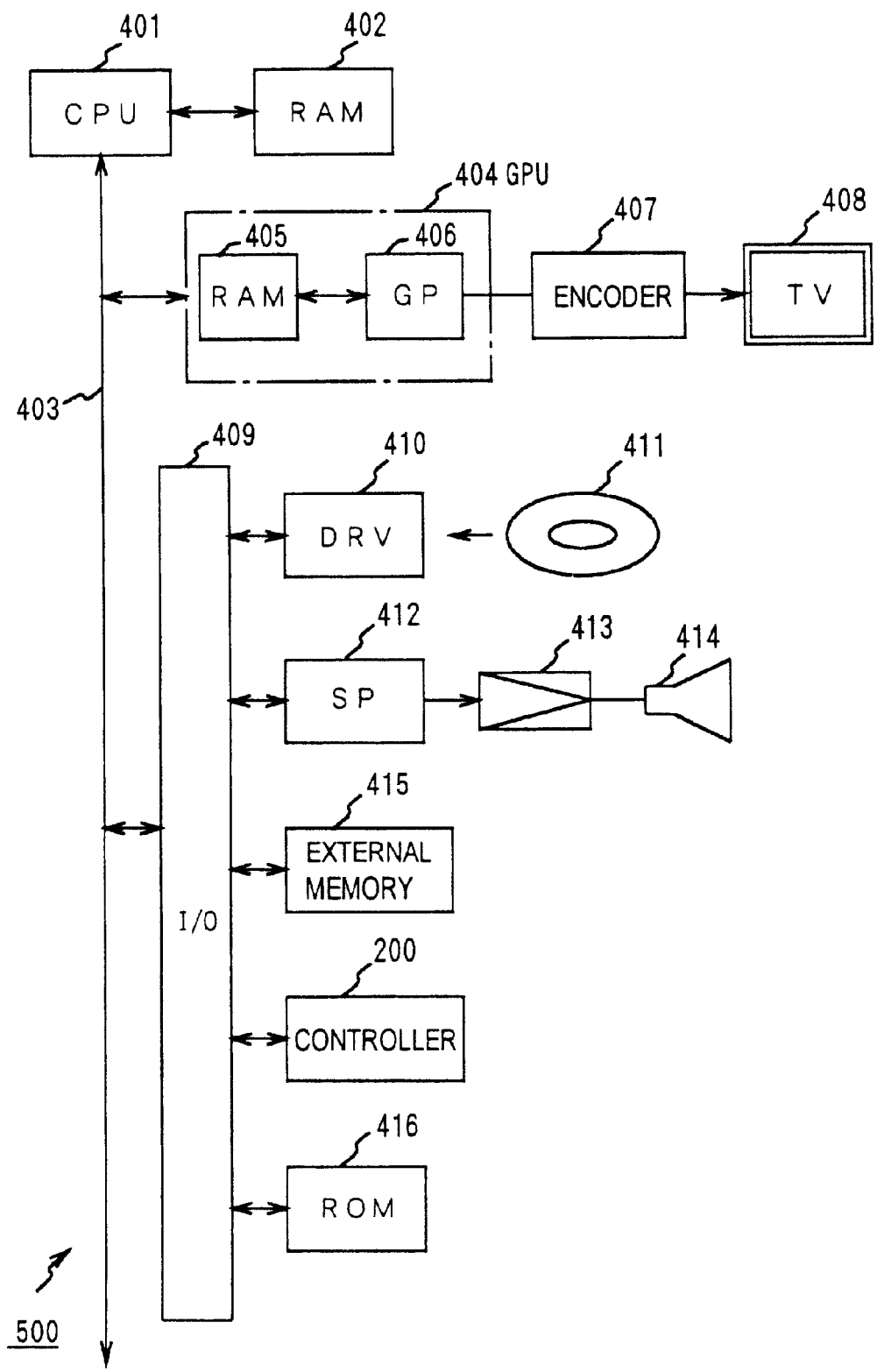
FIG. 6 is a block diagram of the entertainment system.

With reference to FIG. 6, here follows a description of the interior of the entertainment system 500 shown in FIG. 5. FIG. 6 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively.

The GPU 404 is connected via an encoder 407 for converting a digital RGB signal or the like into the NTSC standard television format, for example, to a television monitor (TV) 408 as a peripheral. Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via connector 511 to the entertainment system 500 shown in FIG. 5.

The controller 200 is configured such that, when a plurality of buttons provided thereupon are pushed, it gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data and Z data, the GPU 404 performs the drawing process by writing texture data sequentially into the RAM 405. One frame of image data upon which the drawing process is completed, is encoded by the encoder 407 and then supplied to the television monitor 408 and displayed on its screen as an image.

Figure 7:
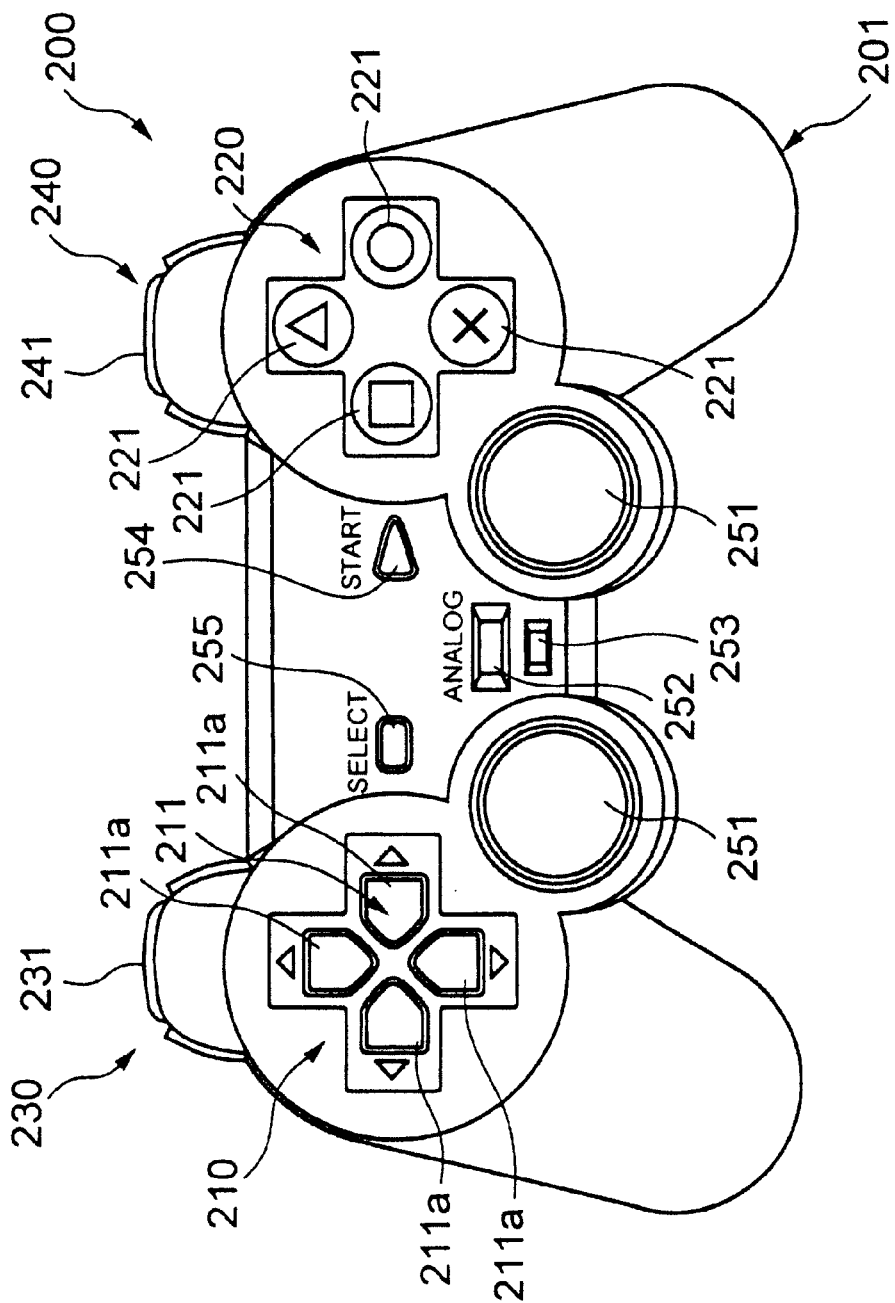
FIG. 7 is a top view of the controller.

FIG. 7 is a top view of controller 200. The controller 200 consists of a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directional by pressing the individual control keys 211a of the cruciform control unit 211.

The second control part 220 is provided with four cylindrical control buttons 221 (control elements) for pushing control. The individual control buttons 221 have identifying marks such as (circle), (triangle), (quadrangle), and x (cross) on their tops, in order to easily identify the individual control buttons 221. The functions of the second control part 220 are set by the game program recorded upon the optical disc 411, and the individual control buttons 221 may be allocated functions that change the state of the game characters, for example.

For example, the control buttons 221 may be allocated functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded on the optical disc, and may be allocated functions for making the game characters do special actions, for example.

Moreover, two joysticks 251 for performing analog operation are provided upon the unit body 201 shown in FIG. 7. The joysticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It is to be noted that on unit body 201 there are also provided a start switch 254 for starting the game and a select switch 255 for selecting the degree of difficulty or the like at the start of a game, and the like.

Controller 200 is held by the left hand and the right hand of the user and is operated by the other fingers of the user, and in particular the user's thumbs are able to operate most of the buttons on the top surface of the controller.

FIG. 8 and FIGS. 9A–9C are, respectively, an exploded perspective view and cross-sectional views showing the second control part of the controller.

Figure 8:
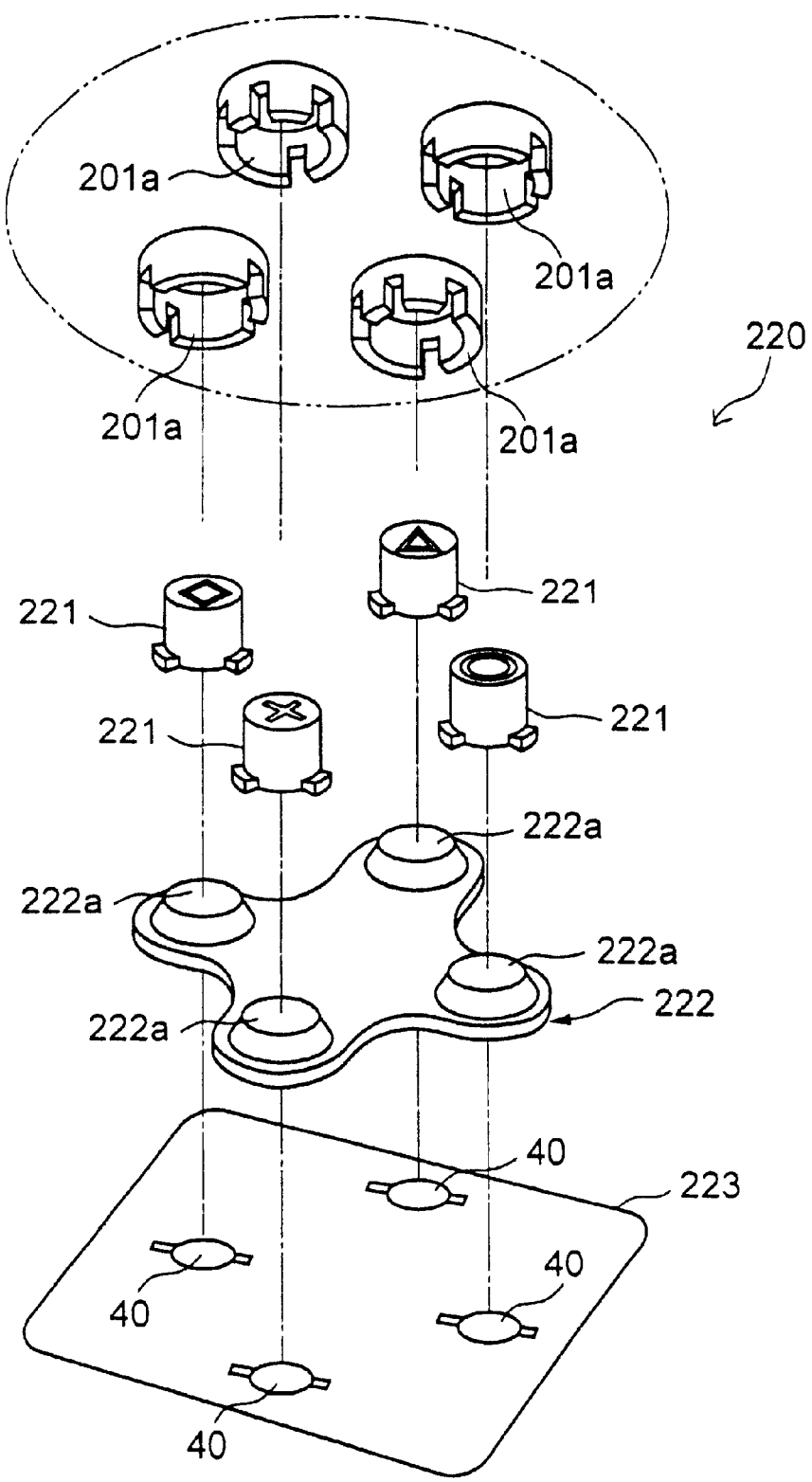
FIG. 8 is an exploded perspective view of the second control part of the controller of FIG. 7.

As shown in FIG. 8, the second control part 220 includes four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221.

Figure 9A:
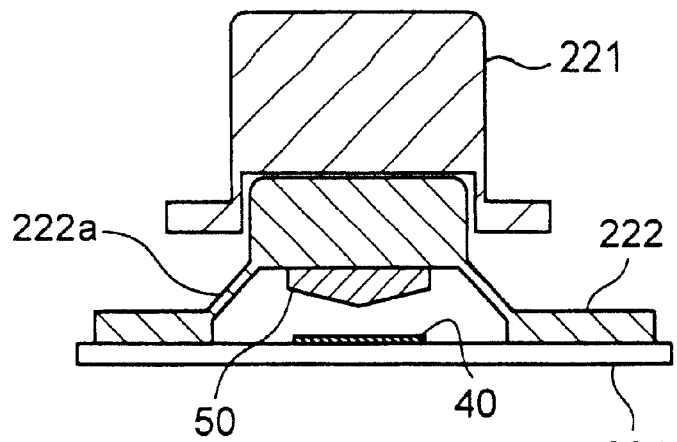
FIGS. 9A–9C are cross-sectional views of the second control part of the controller shown in FIG. 8.
Figure 9B:
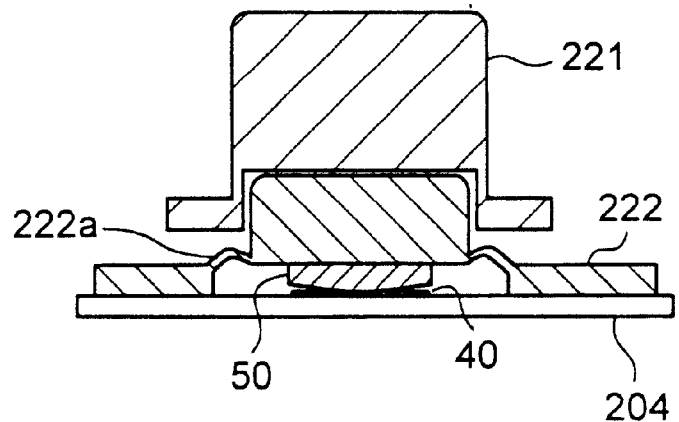
Figure 9C:
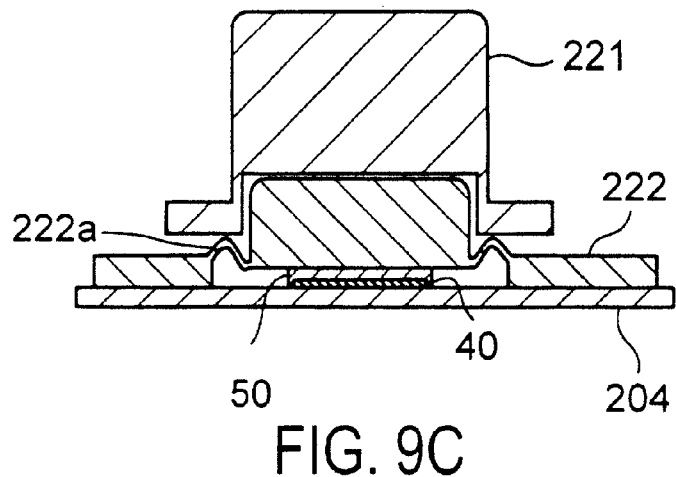

On the other hand, when the pushing pressure on the control buttons 221 is released, the flexed inclined-surface portions of elastic areas 222a elastically return to their original shape, pushing up the control buttons 221. The elastic body 222 functions as a spring means whereby control buttons 221 which had been pushed in by a pushing action are returned to their original positions. As shown in FIGS. 9A–9C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received from the control buttons 221.

To describe this in more detail, as shown in FIGS. 9A–9C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221.

The conducting member 50 deforms, depending on the pushing force on the control button 221 (namely the contact pressure with the resistor 40), so as shown in FIGS. 9B and 9C, the surface area in contact with the resistor 40 varies depending on the pressure. To wit, when the pressing force on the control button 221 is weak, as shown in FIG. 9B, only the area near the conical tip of the conducting member 50 is in contact. As the pressing force on the control button 221 becomes stronger, the tip of the conducting member 50 deforms gradually so the surface area in contact expands.

Figure 10:
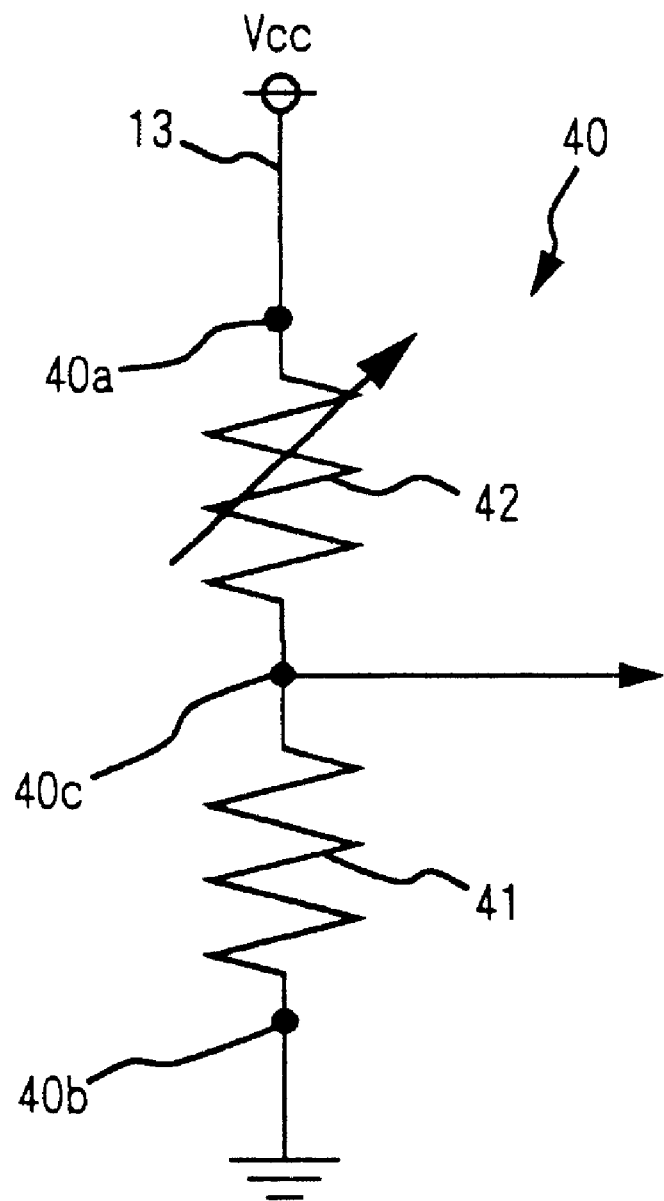
FIG. 10 is a diagram showing an equivalent circuit for a pressure-sensitive device.

FIG. 10 is a diagram showing an equivalent circuit for a pressure-sensitive device consisting of a resistor 40 and conducting member 50. As shown in this diagram, the pressure-sensitive device is inserted in series in a power supply line 13, where the voltage Vcc is applied between the electrodes 40a and 40b. As shown in this diagram, the pressure-sensitive device is divided into a variable resistor 42 that has the relatively small resistance value of the conducting member 50 and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. It should be noted that FIGS. 9A–9C show only the contact portion between the conducting member 50 and the resistor 40 which forms the variable resistor 42 of FIG. 10, but fixed resistor 41 of FIG. 10 is omitted from FIGS. 9A–9C.

In the preferred embodiment, an output terminal is provided near the boundary between variable resistor 42 and fixed resistor 41, namely near the intermediate point of the resistors 40, and thus a voltage stepped down from the applied voltage Vcc by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$.

If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases.

Furthermore, the analog signal (voltage) output from the output terminal 40c of the resistor 40 reaches the maximum $V_{max}$ when the conducting member 50 is most deformed.

Figure 11:
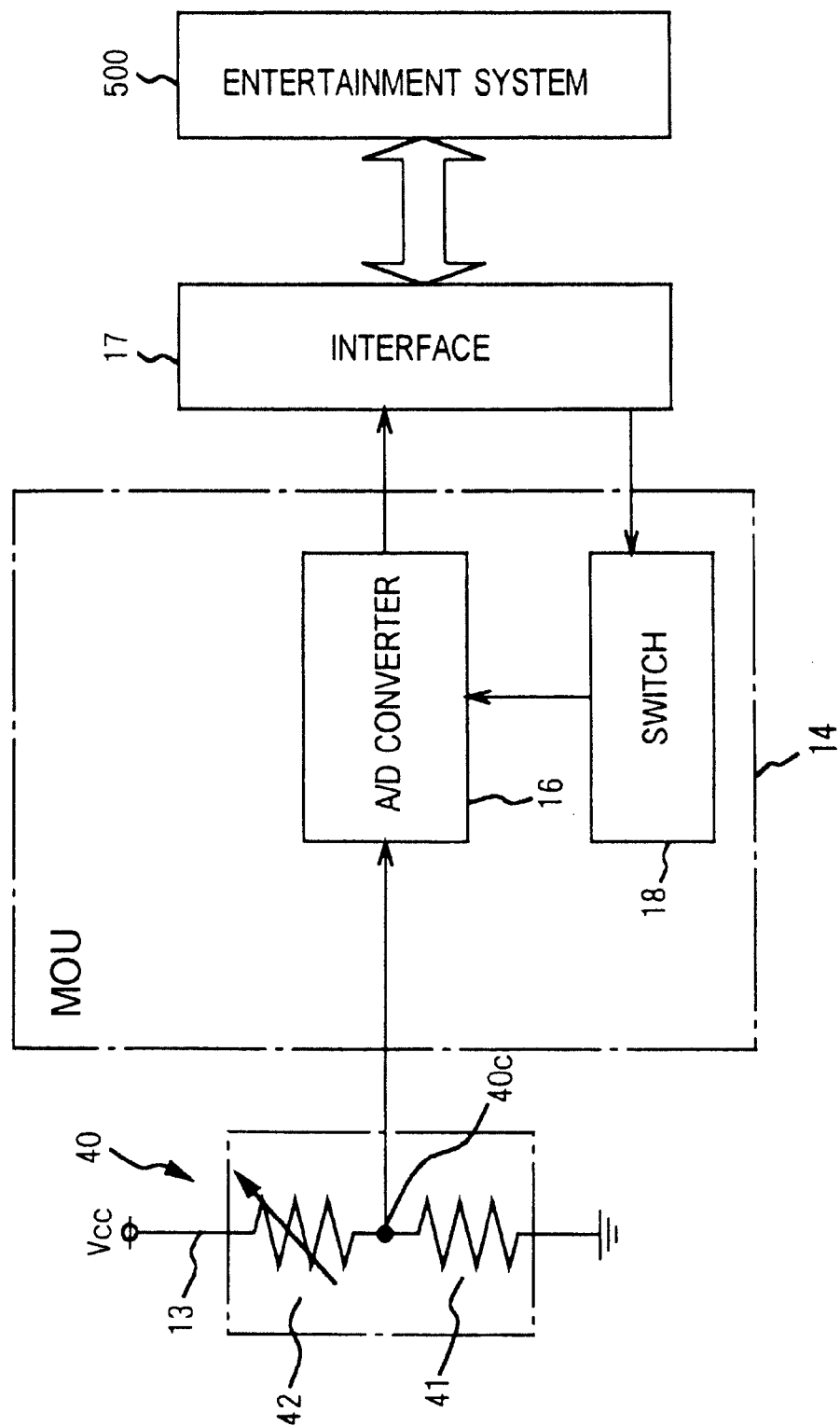
FIG. 11 is a block diagram of the main parts of the controller.

FIG. 11 is a block diagram showing the main parts of the controller 200. An MPU 14 mounted on the internal board of the controller 200 is provided with a switch 18, an A/D converter 16. The analog signal (voltage) output from the output terminal 40c of the resistor 40 is provided as input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received from the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 12:
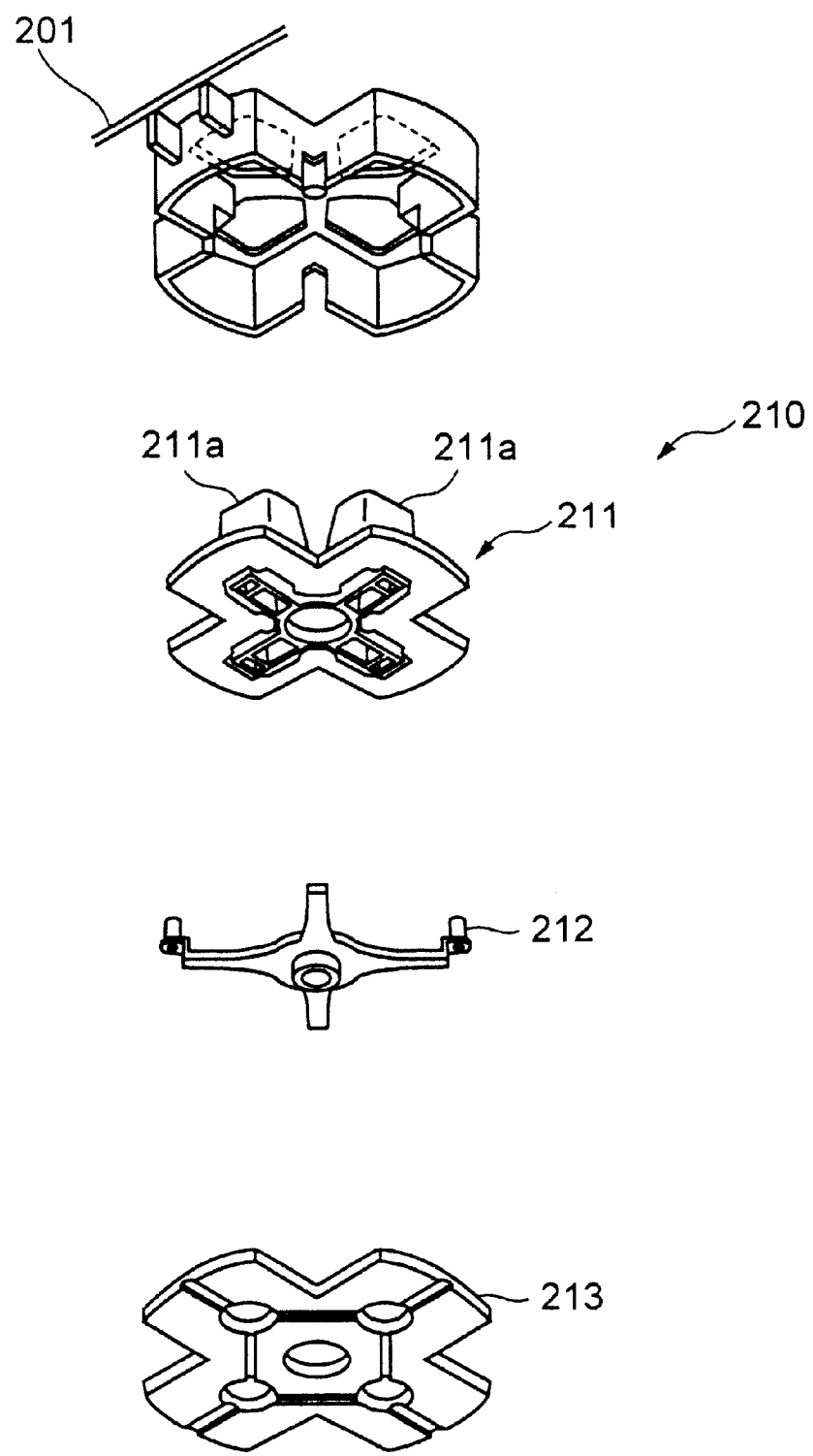
FIG. 12 is an exploded perspective view of the first control part of the controller.
Figure 13:
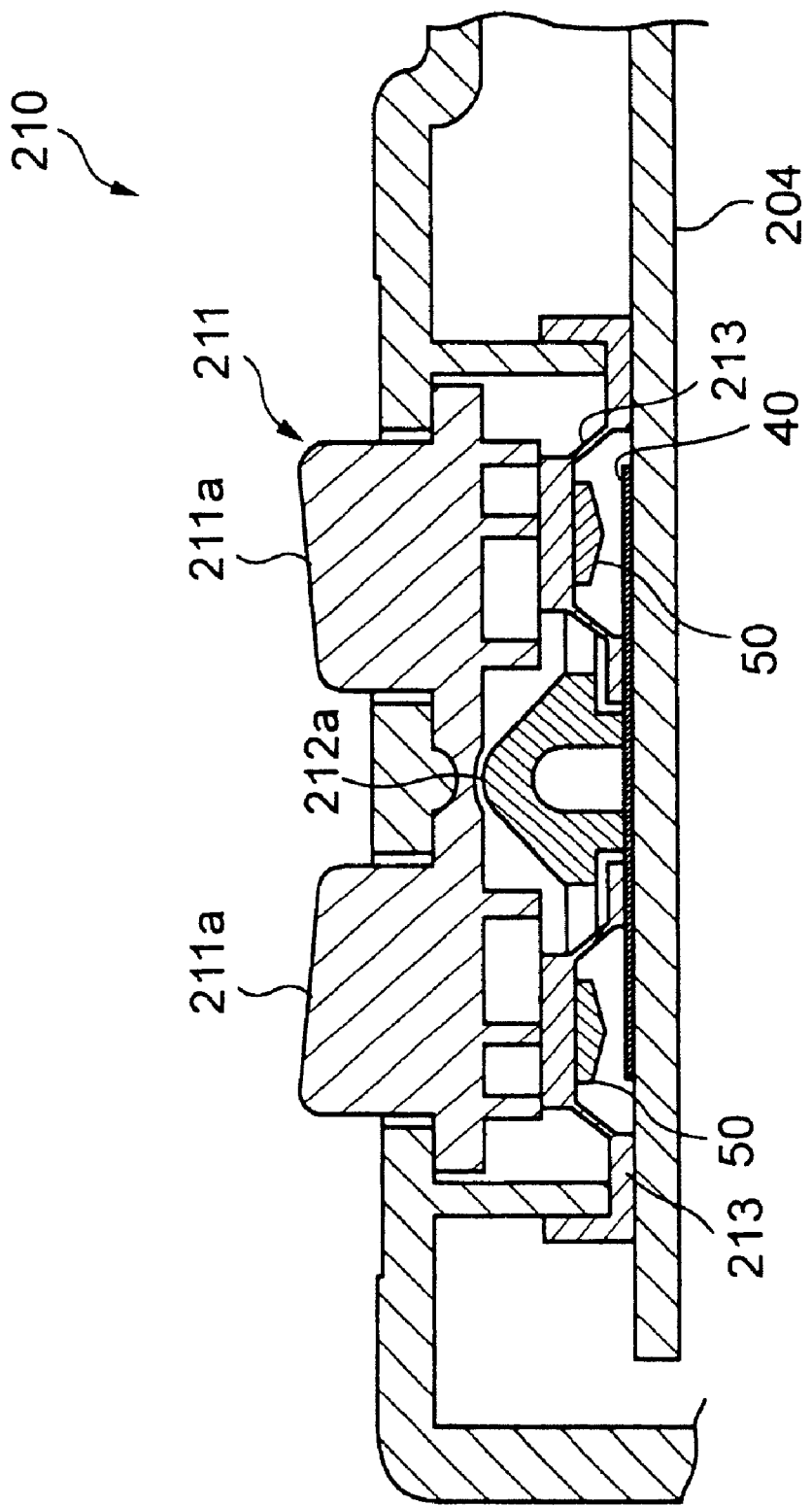
FIG. 13 is a cross-sectional view of the first control part of the controller.

FIGS. 12 and 13 show an example of the configuration of the first control part of the controller.

As shown in FIG. 12, the first control part 210 includes a cruciform control unit 211, a spacer 212 that positions this control unit 211, and an elastic body 213 that elastically supports the control unit 211. Moreover, as shown in FIG. 13, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese Laid-open No. JP-A-H8-163672. The control unit 211, however, uses a hemispherical projection 212a formed in the center of the spacer 212 as a fulcrum, and the individual control keys 211a (control elements) are assembled such that they can push on the resistor 40 side (see FIG. 13).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so its electrical resistance value varies on the magnitude of the pushing pressure.

Figure 14:
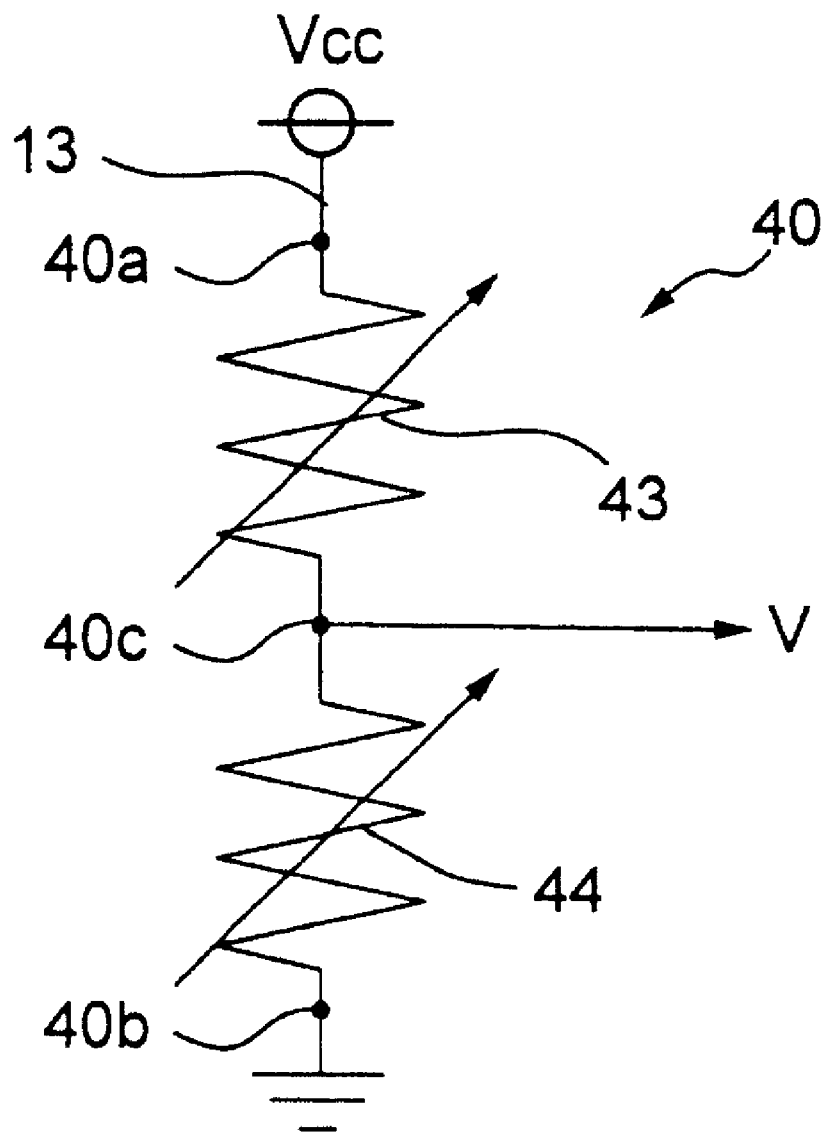
FIG. 14 is a diagram showing the circuit configuration of a resistor.

FIG. 14 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram, the resistor 40 divided into first and second variable resistors 43 and 44.

Among these, the portion of the first variable resistor 43 is in contact, respectively, with the conducting member 50 that moves together with the control key (up-directional key) 211a for moving the character in the up direction, and with the conducting member 50 that moves together with the control key (left-directional key) 211a for moving the character in the left direction, so its resistance value varies depending on the surface area in contact with these conducting members 50.

In addition, the portion of the second variable resistor 44 is in contact, respectively, with the conducting members 50 that moves together with the control key (down-directional key) 211a for moving the character in the down direction, and with the conducting member 50 that moves together with the control key (right-directional key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is provided as output from this output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 15:
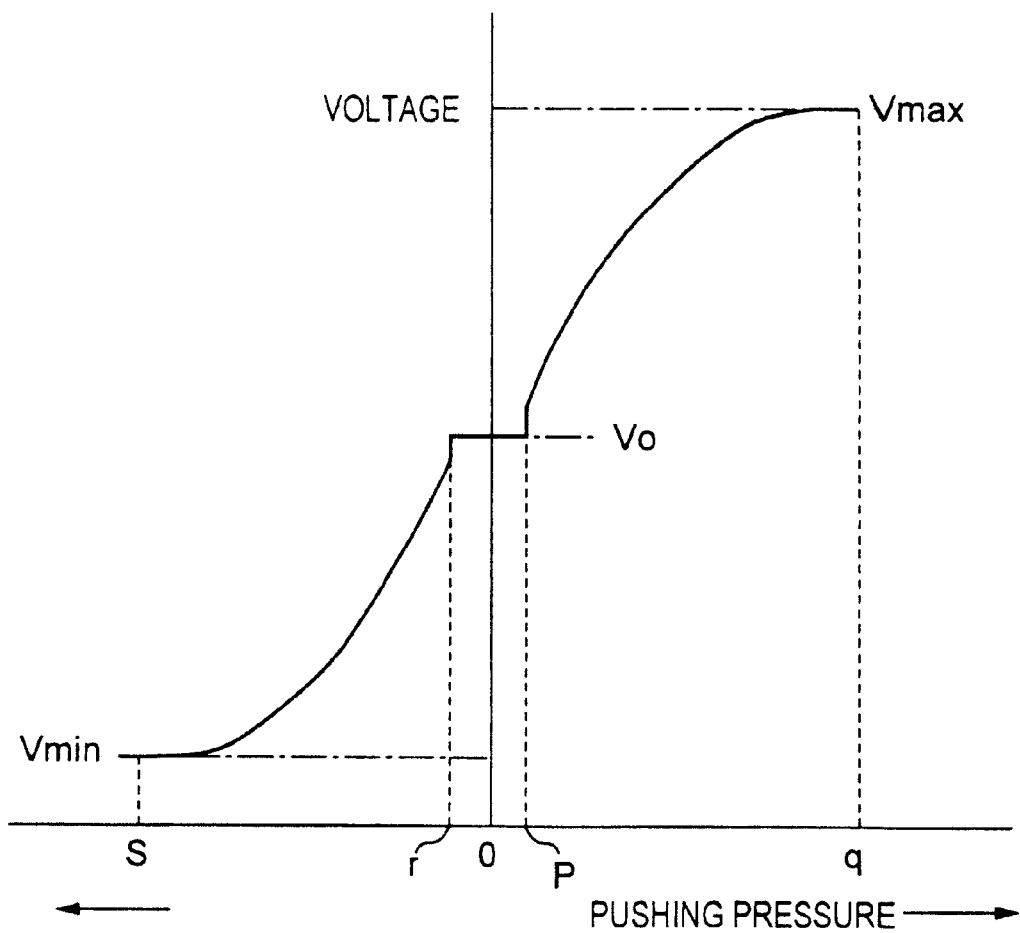
FIG. 15 is a graph showing the characteristic of a signal output.

FIG. 15 is a graph showing the characteristics of the analog signal (voltage) output from the output terminal of the resistor.

First, since a voltage is applied to the resistor 40 when the power is turned on, even if the individual control keys 211a of the control unit 211 are not pressed, a fixed analog signal (voltage) $V_0$ is provided as output from the output terminal 40c (at position 0 in the graph).

Next, even if one of the individual control keys 211a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surface area of contact between the conducting member 50 and the first variable resistor 43 portion increases in response to the pushing pressure on the control key 211a (control elements), and thus the resistance of that portion is reduced so the analog signal (voltage) output from the output terminal 40c of the resistor 40 increases.

Furthermore, the analog signal (voltage) output from the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control element), and thus the resistance of that portion is reduced, and as a result, the analog signal (voltage) output from the output terminal 40c of the resistor 40 decreases.

Furthermore, the analog signal (voltage) output from the output terminal 40c of the resistor 40 reaches a the minimum $V_{min}$ when the conducting member 50 is most deformed (at position S in the graph).

Figure 16:
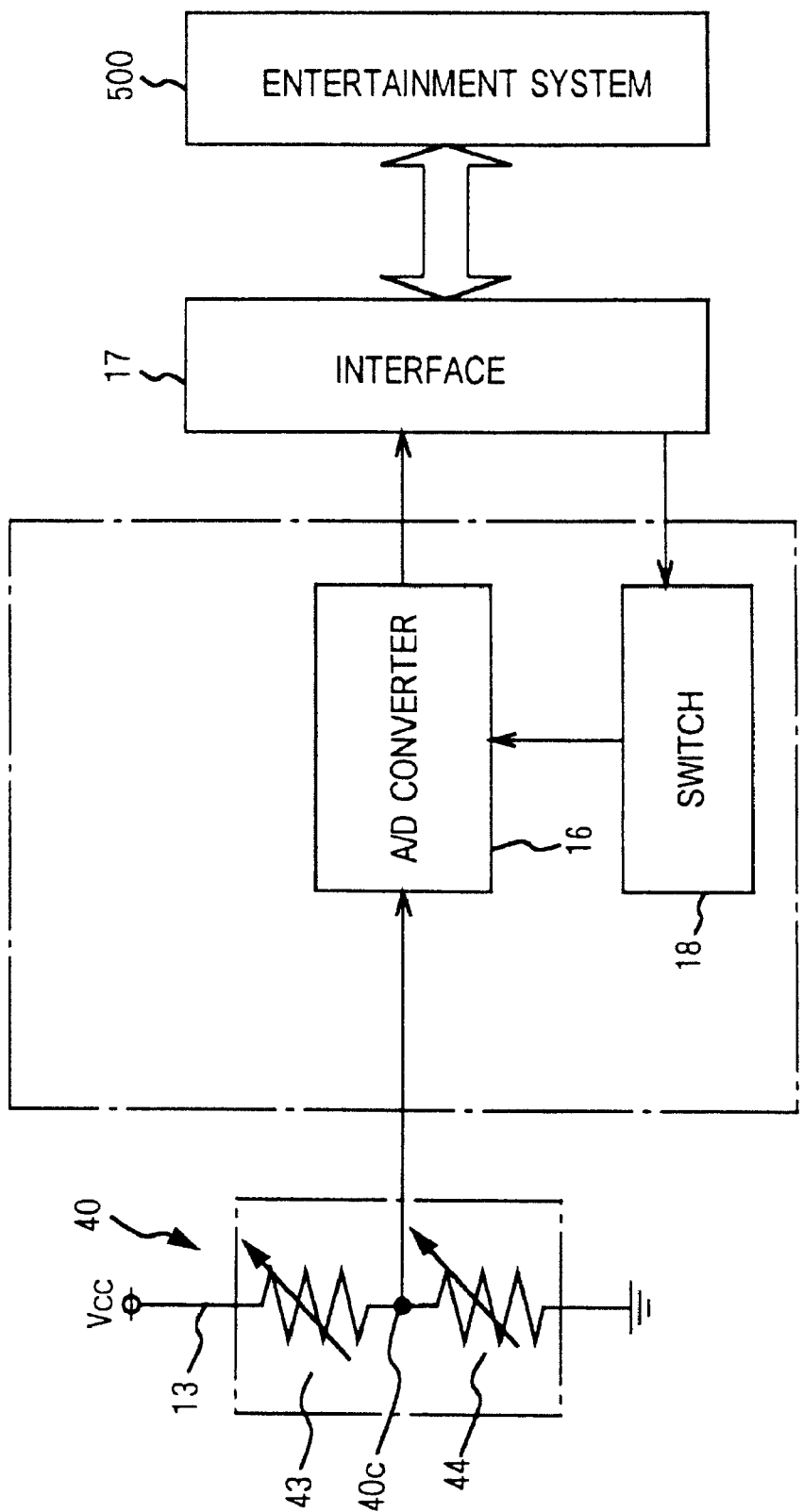
FIG. 16 is a block diagram showing the overall constitution including the resistor.

As shown in FIG. 16, the analog signal (voltage) output from the output terminal 40c of the resistor 40 is provided as input to an A/D converter 16 and converted to a digital signal. It is to be noted that the function of the A/D converter 16 shown in FIG. 16 is as described previously based on FIG. 11, so a detailed description shall be omitted here.

Figure 17:
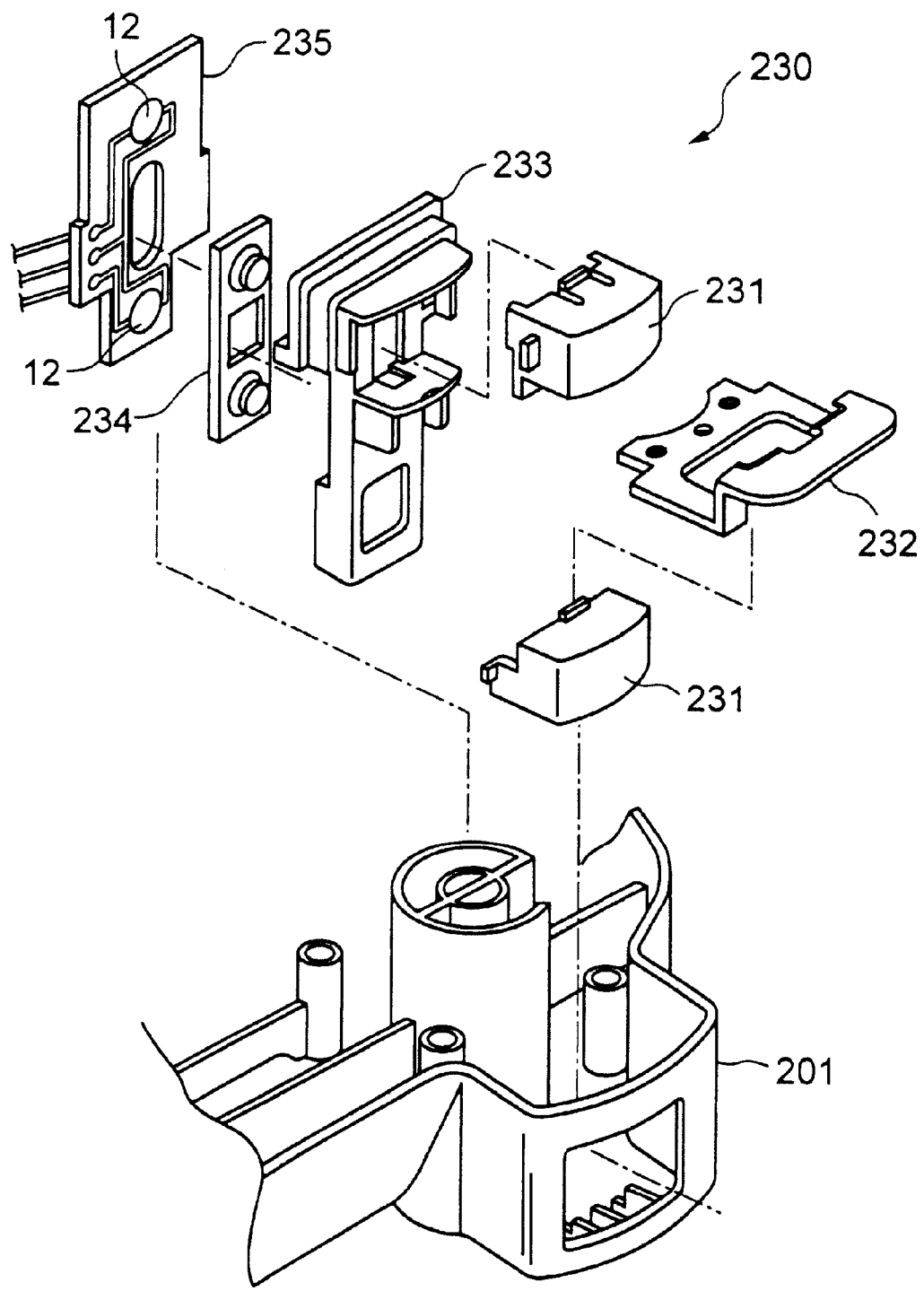
FIG. 17 is an exploded perspective view of the third control part of the controller.

FIG. 17 is an exploded perspective view of the third control part of the controller.

The third controller part 230 consists of two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese Patent Laid-open No. JP-A-H8-163672, so a detailed description thereof will be omitted. The individual control buttons 231, however, can be pushed in while being guided by the spacer 232, the pushing pressure when buttons 231 are pressed, acts via the elastic body 234 on the pressure-sensitive device consisting of conducting member 50 and resistor 40. The electrical resistance value of the pressure-sensitive device varies depending on the magnitude of the pushing pressure it receives.

It is noted that the fourth control part 240 has the same structure as that of the third control part 230 described above.

In the aforementioned description, a flowchart for viewpoint switching is shown in FIG. 4. This program may be supplied either recorded alone upon an optical disc or other recording medium, or recorded upon said recording medium together with the game software as part of the game software. These programs are run by the entertainment system 500 and executed by its CPU.

Here, the meaning of supplying the program for viewpoint switching recorded individually on a recording medium has the meaning of preparing it in advance as a library for software development. As is common knowledge, at the time of developing software, writing all functions requires an enormous amount of time.

However, if the functions of such enormous software are divided by the type of function, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

Figure 18A:
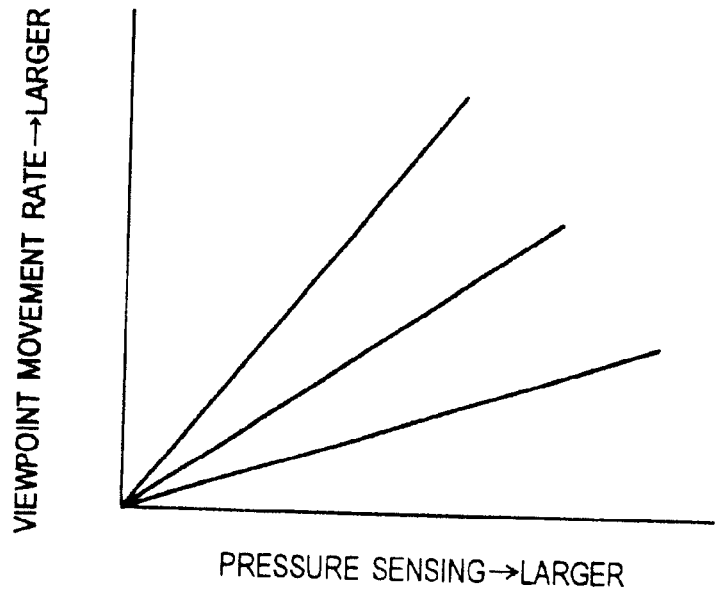
FIGS. 18A and 18B show characteristic graphs of the rate of change of viewpoint movement relative to the pressure-sensing value.
Figure 18B:
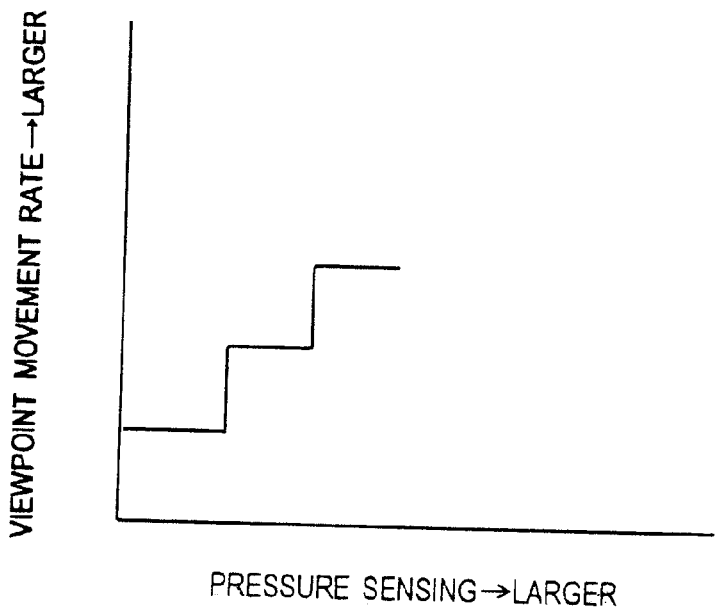

In addition, the aforementioned description of FIG. 2 indicates the increase or decrease of the positions of viewpoints depending on the pressure-sensing value, but this increase or decrease of the positions has the meaning of making changes to the positions of viewpoints depending on the magnitude of the pressure-sensing value. However, when handling pressure-sensitive values, even more diverse changes in viewpoints are possible. Various viewpoint changes are possible, such as shown in FIG. 18A, where several types of characteristics (3 types shown in the figure) may be arranged so that when a continuous pressure-sensing value is given, the viewpoint is made closer or further at a rate of change depending on the pressure-sensing value at that time, or as shown in FIG. 18B, the rate of change may be varied stepwise depending on the magnitude of the pressure-sensing value. Therefore, when the viewpoint is changed depending on the differential of pressure-sensing values, the viewpoint change may be made based on the differential of the rate of change.

In this manner, changes in the movement or switching of the viewpoint can be made depending on the pressure-sensing value.

While an embodiment was described above, the present invention may also assume the following alternative embodiment. In the described embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese Patent Laid-open No. 2000-40257 and the corresponding PCT Application PCT/JP01/00136.

As described above, in this embodiment, the viewpoint positions are set in realtime depending on the pressure-sensing value, so the user interface can be improved compared to the switching of viewpoint positions based on simple ON/OFF switches.

I claim:

1. A recording medium on which is recorded a computer-readable and executable software program that performs processing by taking as instructions on output from a controller which has a plurality of pressing members and a plurality of respective pressure-sensitive means associated with said plurality of pressing members for providing variable outputs having magnitudes depending on pressing forces applied to said plurality of pressing members, each pressing member of said plurality associated with a separate viewpoint for viewing an object on a screen, wherein said software program comprises, in a mode in which a viewpoint position of an object within a screen of a computer is changed by simultaneously pressing at least a first pressing member having a first viewpoint associated therewith and a second pressing member having a second viewpoint associated therewith, obtaining an output from the pressure-sensitive means from each of said simultaneously-pressed first and second pressing members, designating the pressing member having the pressing means with the greatest output, and changing to a viewpoint position corresponding to said designated pressing member.

2. The recording medium according to claim 1, wherein said made in which the viewpoint is switched is a mode when a specific switch of said controller previously defined in said software is pressed by a user, or after said switch has been pressed by a user.

3. The recording medium according to claim 1, wherein when at least two or more pressing members of said plurality of pressing members are pushed by a user, the viewpoint position is determined according to the difference between the outputs of the respective pressure-sensitive means that sense pushing-pressures of said two or more pushed pressing members, respectively.

4. The recording medium according to claim 1, wherein said controller has six pressing members associated with six respective viewpoint positions.

5. A method of switching a viewpoint position of objects in an entertainment system including a controller which has a plurality of buttons and a plurality of pressure-sensitive means associated with said plurality of buttons for providing variable outputs having magnitudes depending on pressing forces applied to said plurality of buttons, each button of said plurality being associated with a separate viewpoint position, the method comprising the steps of;

when a first button of said plurality is pushed by a user, sensing a first variable output by the pressure-sensitive means associated with said first pushed button;

when one or more buttons of said plurality is pushed by a user simultaneously with the pushing of the first button, sensing a variable output by the pressure-sensitive means associated with said one or more pushed buttons;

receiving at said entertainment system the variable outputs of said pressure-sensitive means corresponding to the pushing of said pushed buttons; and determining the button associated with the greatest variable output of said pushed buttons and changing to the viewpoint position associated with said determined button.

6. The method of switching the viewpoint according to claim 5, wherein at a point in time that said determined button is pushed by a user, the corresponding pressure-sensitive means associated with said determined button provides an output to change the viewpoint position of an object toward the position allocated to said determined button, and then continuously changes the viewpoint position depending on the continued pushing of said determined button.

7. The method of switching the viewpoint according to claim 5, wherein the viewpoint position is determined according to the difference between the variable outputs of the pressure-sensitive means of pushed buttons, respectively.

8. The method of switching the viewpoint according to claim 5, wherein the viewpoint position changes at a rate that is proportional to the variable output of the pressure-sensitive means associated with said determined button.

9. The method of switching the viewpoint according to claim 5, wherein the viewpoint position changes in a step-wise manner depending on the variable output of the pressure-sensitive means associated with said determined button.

10. An entertainment system comprising:

a controller including a plurality of buttons and a plurality of pressure-sensitive means associated with said plurality of buttons for providing variable outputs having magnitudes depending on pushing forces applied to said plurality of buttons respectively;

each button of said plurality being associated with a separate viewpoint position of an object on a screen;

means for receiving the variable outputs of the pressure-sensitive means that corresponds to pushing pressures applied to one or more of said buttons;

means for determining the greatest variable output from the variable outputs of the pressure-sensitive means corresponding to the pushing pressures applied to said one or more of said buttons that were pushed and associating said greatest variable output with its respective button, and in a mode in which the viewpoint position of objects within a screen of the entertainment system is changed, changing the viewpoint position to a position Corresponding to the button associated with the greatest variable output, wherein when at least two of said plurality of buttons are simultaneously pushed by a user, the viewpoint position is determined according to the difference between the variable outputs of the pressure-sensitive means related to said at least two simultaneously pushed buttons, respectively.

11. The entertainment system according to claim 10, wherein said controller further comprises at least four buttons corresponding to at least four separate viewpoints respectively.

12. The entertainment system according to claim 10, wherein said controller further comprises six buttons corresponding to six separate viewpoints respectively.

13. The entertainment system according to claim 10, wherein the viewpoint position changes at a rate that is proportional to the greatest variable output of the respective pressure-sensitive means.

14. The entertainment system according to claim 10, wherein the rate of change of the viewpoint position changes in a step-wise manner depending on the greatest variable output of the respective pressure-sensitive means.

15. A recording medium on which is recorded a computer-readable and executable software program that performs processing by taking as instructions on output from a controller which has a plurality of pressing members and a plurality of respective pressure-sensitive means associated with said plurality of pressing members for providing a plurality of variable outputs having magnitudes depending on pressing forces applied to said plurality of pressing members, each pressing member of said plurality associated with a separate viewpoint for viewing an object on a screen, wherein said software program comprises, when a first pressing member of said plurality is pushed by a user, obtaining a first variable output by the first pressure-sensitive means associated with said first pushed pressing member;

when one or more additional pressing members of said plurality is pushed by a user simultaneously with the pushing of the first pressing member, obtaining a variable output by the pressure-sensitive means associated with said one or more additional pressing members;

determining the pressing member associated with the greatest variable output selected from the outputs from all of the pressing members that were simultaneously pushed; and in a mode in which a viewpoint position of an object within a screen of a computer is changed by pressing at least two of said pressing members simultaneously, changing a viewpoint position on a screen to the viewpoint position associated with said determined pressing member.

16. An entertainment system comprising:

a plurality of pressure-sensitive means for switching a viewpoint position of an object displayed on a screen, each pressure-sensitive means being associated with a separate and preset viewpoint position and each pressure-sensitive means providing a variable output, wherein when one of the pressure-sensitive means is operated, an image of the object is viewed from the preset viewpoint position associated with said one pressure-sensitive means, and wherein when at least two pressure-sensitive means are simultaneously operated, said image of the object is viewed from a viewpoint position that is determined based on both the preset viewpoint positions of said at least two pressure-sensitive means and the variable outputs provided by said at least two pressure-sensitive means.

17. The entertainment system according to claim 16, wherein when said at least two pressure-sensitive means are operated, the viewpoint position of the image of the object is determined by:

obtaining a difference between the variable outputs of said at least two pressure-sensitive means and obtaining the greater of said variable outputs, setting the viewpoint position of the image of the object on the midpoint between the preset viewpoint positions associated with said at least two pressure-sensitive means, and incrementally shifting the viewpoint position of the image of the object by the amount of the difference between the variable outputs toward the preset viewpoint position associated with the pressure-sensitive means providing greater of the variable outputs.

18. A recording medium on which as recorded a computer-readable and executable software program that performs processing by raking as instructions on output from a controller which has a plurality of pressure-sensitive means for switching a viewpoint position of an object within a screen, each pressure-sensitive means providing a variable output, said software program comprises:

associating each pressure-sensitive means with a separate and preset viewpoint position, wherein when one of the pressure-sensitive means is operated, displaying an image of the object viewed from the preset viewpoint position associated with said one pressure-sensitive means, and wherein when at least two pressure-sensitive means are simultaneously operated, displaying said image of the abject viewed from a viewpoint position that is determined based on both the preset viewpoint positions of said at least two pressure-sensitive means and the variable outputs provided by said at least two pressure-sensitive means.

19. The recording medium according to claim 18, wherein when at least two pressure-sensitive means are simultaneously operated, said software program further comprises:

determining the viewpoint position of the image of the object by obtaining a difference between the variable outputs of said at least two pressure-sensitive means and obtaining the greater of said variable outputs, setting the viewpoint position of the image of the object on the midpoint between the preset viewpoint positions associated with said at least two pressure-sensitive means, and incrementally shifting the viewpoint position of the image of the object by the amount of the difference between the variable outputs toward the preset viewpoint position associated with the pressure-sensitive means providing greater of the variable outputs.

20. A software program stored on a computer-readable medium that performs processing by taking as instructions on output from a controller which has a plurality of pressure-sensitive means for switching a viewpoint position of an object within a screen, said pressure-sensitive means providing variable outputs on their operations, said software program comprising:

associating each pressure-sensitive means with a separate and preset viewpoint position, wherein when one of the pressure-sensitive means as operated, displaying an image of the object on said screen viewed from the preset viewpoint position associated with said one pressure-sensitive means, and wherein when at least two pressure-sensitive means are simultaneously operated, displaying said image of the object on said screen viewed from a viewpoint position that is determined based on both the preset viewpoint positions of said at said at least two pressure-sensitive means and the variable outputs provided by said at least two pressure-sensitive means.

21. The software program according to claim 20, wherein when at least two pressure-sensitive means are simultaneously operated, said software program further comprises:

determining the viewpoint position of the image of the object by obtaining a difference between the variable outputs of said at least two pressure-sensitive means and obtaining the greater of said variable outputs, setting the viewpoint position of the image of the object on the midpoint between the preset viewpoint positions associated with said at least two pressure-sensitive means, and incrementally shifting the viewpoint position of the image of the object by the amount of the difference between the variable outputs toward the preset viewpoint position associated with the pressure-sensitive means providing greater of the variable outputs.

* * * * *